United States Patent [19]
Sostek et al.

[11] Patent Number: 5,841,139
[45] Date of Patent: Nov. 24, 1998

[54] OPTICAL INSTRUMENT PROVIDING COMBINED INFRARED AND RAMEN ANALYSIS OF SAMPLES

[75] Inventors: Ronald Y. Sostek, Newton Center; Norman A. Wright, Billerica, both of Mass.

[73] Assignee: Bio-Rad Laboratories, Inc., Hercules, Calif.

[21] Appl. No.: 808,745

[22] Filed: Feb. 28, 1997

[51] Int. Cl.$^6$ .............................. G01J 3/44; G01J 21/65; G01J 21/35

[52] U.S. Cl. ............................. 250/339.12; 250/339.05; 250/339.07; 250/339.11; 356/301

[58] Field of Search ..................... 250/339.01, 339.05, 250/339.6, 339.07, 339.08, 339.11, 339.12; 356/301

[56] References Cited

U.S. PATENT DOCUMENTS

| | | | |
|---|---|---|---|
| 5,251,008 | 10/1993 | Masutani | 356/346 |
| 5,278,413 | 1/1994 | Yamaguchi et al. | 250/347 |
| 5,351,121 | 9/1994 | Baer et al. | 356/301 |
| 5,377,003 | 12/1994 | Lewis et al. | 356/300 |
| 5,377,004 | 12/1994 | Owen et al. | |

OTHER PUBLICATIONS

Raman Spectrometers HoloProbe VPT System™ (Kaiser Optical Systems, Inc.), 8–pages, Kaiser Optical Systems, Inc., P.O. Box 983, Ann Arbor, MI 84106.

The UMA 500 Microspectroscopy Accessory: Research Infrared Microscopy with Fingertip Control (Bio–Rad/Digilab), 6–pages, Bio–Rad Digilab, 237 Putnam Avenue, Cambridge, MA 02139.

*Primary Examiner*—Edward J. Glick
*Assistant Examiner*—Darren M. Jiron
*Attorney, Agent, or Firm*—Townsend and Townsend and Crew LLP

[57] ABSTRACT

Apparatus for IR and Raman analysis of a sample includes an optical train having a common path segment that includes the sample, and a mechanism for selectively or simultaneously) subjecting the sample to analytic radiation (such as IR) or Raman excitation radiation, and selectively (or simultaneously) detecting the analytic radiation from the sample or the Raman scattered light from the sample. In a specific embodiment, the apparatus includes a sample stage for holding the sample; an infrared source; an infrared detector; a source of Raman excitation light; a Raman spectrometer; infrared and visible (Raman) light objectives selectively positionable in the common path segment; an optical train disposed in the common path segment for transferring light between the sample and a particular location; and a mechanism for selectively (or simultaneously) (a) directing analytical radiation to the sample and analytical radiation from the sample to the infrared detector, or (b) directing Raman excitation light to the sample and Raman scattered light to the Raman spectrometer. The mechanism can be a movable mirror or a fixed dichroic beam splitter.

17 Claims, 8 Drawing Sheets

OPTICAL INSTRUMENT PROVIDING COMBINED INFRARED AND RAMEN ANALYSIS OF SAMPLES

CROSS REFERENCE TO RELATED APPLICATIONS

This application claims priority from and hereby incorporates by reference the entire disclosure, including attached documents, of the following provisional application:

Application No. 60/039,556, filed Feb. 26, 1997, to Ronald Y. Sostek and Norman A. Wright for "Optical Instrument Providing Combined Infrared and Raman Analysis of Samples" (Attorney Docket 2558C-584).

BACKGROUND OF THE INVENTION

The present invention relates generally to spectroscopy, and more specifically to techniques for performing infrared (IR) and Raman analysis.

Fourier transform infrared spectroscopy (FT-IR) and Raman spectroscopy are both types of vibrational spectroscopy, providing the energy levels of the vibrational modes of a molecule. With knowledge of the complete vibrational spectrum of a chemical compound, scientists can deduce its structure and they can compute its thermodynamic and physical properties. Since infrared and Raman spectroscopy are based on different physical processes (infrared spectroscopy is based on direct absorption of light by the molecule, and Raman spectroscopy is based on scattering of a high energy photon off the molecule, with a small amount of the energy absorbed by the molecule), the selection rules for the sensitivity of different types of vibrations are different in the two types of spectroscopy.

The infrared absorptivity of a vibrational mode (the probability that a given vibration will absorb infrared energy) is related to the change of dipole moment of the vibration. Vibrational modes with a high change of dipole moment will have a large infrared sensitivity, and vice versa, with vibrations with no change of dipole moment completely absent in the infrared spectrum. For this reason, molecules such as $N_2$, $O_2$, $Cl_2$, etc. have no infrared spectrum. The sensitivity of a vibrational mode in the Raman spectrum, however, is related to the change in polarizability of the vibration, and thus vibrations with little or no dipole moment and a high degree of symmetry are favored. A full theoretical discussion of the selection rules of infrared and Raman spectroscopy can be found in A. Lee Smith, *Applied Infrared Spectroscopy*, John Wiley and Sons, New York, N.Y. (1979) and in John R. Ferraro and Kazuo Nakamoto, *Introductory Raman Spectroscopy*, Academic Press, San Diego, Calif. (1994), respectively.

Therefore, infrared and Raman spectroscopy tend to be complementary techniques, and both types of spectroscopy are required to measure the complete vibrational spectrum. Both these techniques are well developed, and instruments for carrying out each of the techniques are commercially available. For example, Raman spectrometers marketed under the HoloProbe mark are available from Kaiser Optical Systems, Ann Arbor, Mich. An infrared microscope, marketed under the UMA 500 mark, is available from Bio-Rad Laboratories, Inc., Hercules, Calif. (Digilab Division, Cambridge, Mass.). The infrared microscope is typically used with an FT-IR spectrometer, available from Bio-Rad Laboratories.

Accordingly, when it is desired to perform both types of spectroscopy on a sample, the sample is first analyzed using one of the instruments, and then moved to the other for subsequent analysis. The corresponding spectral information from the two instruments can then be correlated and analyzed. One problem that arises is that the features whose spectra are desired are often microscopically small. Accordingly, it is often difficult to make sure that the same portion of the sample is being subjected to the two types of analysis.

SUMMARY OF THE INVENTION

The present invention provides the capability of performing microscopic infrared analysis and microscopic Raman spectroscopy on the same sample, on the same microscope, without removing the sample once it is set up for analysis.

In brief, apparatus according to the present invention includes an optical train having a common path segment that includes the sample, and a mechanism for selectively (or, in some embodiments, simultaneously) subjecting the sample to analytic radiation (such as IR) or Raman excitation radiation, and selectively (or simultaneously) detecting the analytic radiation from the sample or the Raman scattered light from the sample.

In a specific embodiment, the apparatus includes a sample stage for holding the sample; an infrared source; an infrared detector; a source of Raman excitation light; a Raman spectrometer; infrared and visible (Raman) light objectives selectively positionable in the common path segment; an optical train disposed in the common path segment for transferring light between the sample and a particular location; and a mechanism for selectively (or simultaneously) (a) directing analytical radiation to the sample and analytical radiation from the sample to the infrared detector, or (b) directing Raman excitation light to the sample and Raman scattered light to the Raman spectrometer.

The mechanism can be a movable mirror at the particular location such that (a) when the mirror is in a first position, light travelling along the common path segment is communicated to the infrared detector, and (b) when the mirror is in a second position, light travelling along the common path segment is coupled to the Raman spectrometer. The mechanism can also be a fixed dichroic beam splitter.

In a specific implementation, the common optical path is provided in an infrared microscope of the type having a separate switchable viewing path. A Raman probe head is mounted to be optically coupled into the viewing path, and communicates with a Raman spectrometer base unit via optical fibers. In an alternative embodiment, the Raman scattered light is communicated to a Fourier transform spectrometer.

In additional embodiments, sources and detectors can be selectively interposed in a fixed path to effect the infrared or Raman measurements.

A further understanding of the nature and advantages of the present invention may be realized by reference to the remaining portions of the specification and the drawings.

DESCRIPTION OF SPECIFIC EMBODIMENTS

Figure 1:
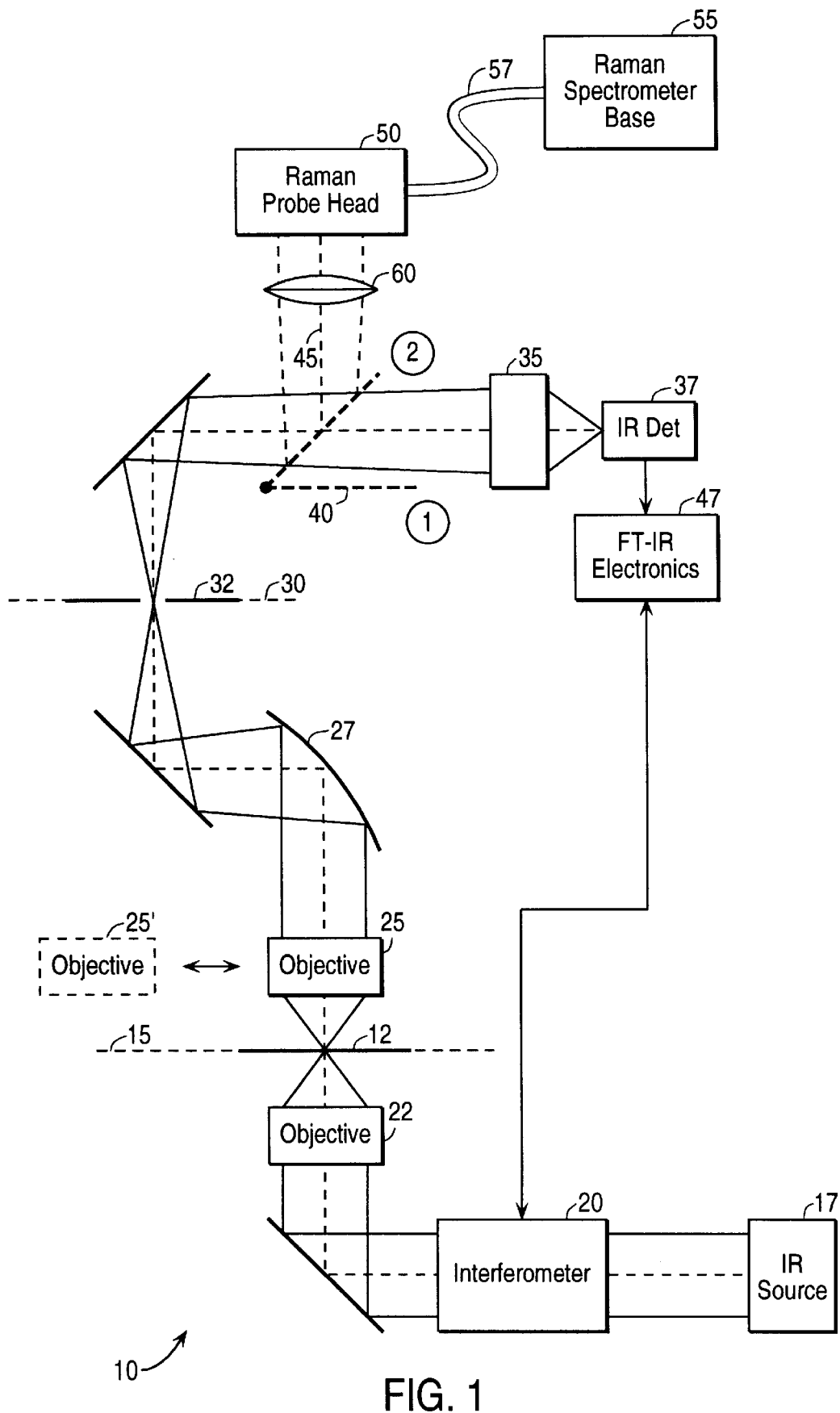
FIG. 1 is a schematic optical view showing a combined infrared/Raman microscope system according to one embodiment of the invention.

FIG. 1 is a schematic optical view showing a combined infrared/Raman microscope system 10 according to one embodiment of the present invention. The system combines the functionally of an FT-IR microscope and a Raman microscope for the purpose of performing FT-IR and Raman analysis of a sample mounted on a sample stage 12 in a sample plane 15. The figure shows a particular orientation, which reflects the specific embodiment. For convenience, directional references will be made with respect to the illustrated orientation.

Infrared Mode

In a specific embodiment, the infrared functionality of the overall system is provided by an infrared microscope such as the above-mentioned UMA 500 FT-IR microscope, which is available from Bio-Rad Laboratories.

In the infrared mode, infrared light from an infrared source 17, typically modulated by an interferometer 20, is directed to the sample. In the particular configuration shown, the infrared light is directed upwardly through the sample in transmission mode. To this end, the infrared light is directed to a condenser 22, which brings the infrared light to a focus in the sample plane. Light emanating from the sample plane is collected by an infrared objective 25, which collimates the light and directs it to a curved mirror 27, which focuses the light in an image plane 30 which typically has a sample mask 32 for limiting the field of view.

In a reflectance measurement, the infrared light would be directed downwardly through the objective to encounter the sample from above. The infrared light would be directed into a portion of the objective's aperture, and the light emanating from the sample would be collected by the remaining portion of the objective's aperture. This would be effected by having a movable mirror (not shown) selectively interposed between mirror 27 and objective 25. In either case, the light emerging from the image plane is then directed to a second objective 35, which focuses the light on an infrared detector 37.

A mirror 40, shown in phantom, is moveable between first and second positions, denoted by circled numerals, with the first position allowing the light to reach the infrared detector and the second position deflecting the light to an alternate path 45. The portion of the optical path between the sample and mirror 40, when in the second position, is sometimes referred to as the common path segment.

In the prior art infrared microscope, a viewing element such as a camera or binocular viewer would be disposed in path 45. To accommodate the viewing functionality, a visible light source would be selectively coupled into the IR path by another moveable mirror (not shown), and mirror 40 moved into the second position to deflect visible light onto path 45. The capability of coupling viewing radiation into the infrared microscope path and the capability of coupling the infrared source above or below the objective are well known and will not be described further. Some background information on this subject is found in U.S. Pat. No. 5,295,017 to Brown for "Sample Masking Using wavelength-Selective Material," hereby incorporated by reference. Further, in accordance with known practice, a number of flat folding mirrors are interposed in the path for making the microscope more compact.

Interferometer 20 and infrared detector are coupled to control and analysis electronics, shown collectively as an FT-IR electronics block 47. The control of the interferometer and the processing of the infrared detector signal are not part of the invention and will not be described in detail here. U.S. Pat. No. 5,166,749 to Curbelo et al. for "Step Scanning Technique for Interferometer", and U.S. Pat. No. 5,262,635 to Curbelo for "Techniques for Correcting Non-Linearity in a Photodetector Using Predefined Calibration Information" provide relevant background information and are hereby incorporated by reference.

It is also possible to provide a dichroic beam splitter (dichroic filter) having a fixed position in the path corresponding to the second position of movable mirror 40. This dichroic beam splitter would pass infrared light to the infrared detector and reflect Raman light onto path 45. As such, such a dichroic beam splitter could be used as a substitute for the movable mirror. In the description that follows, references to movable mirror 40, as well as other movable mirrors in other embodiments should be taken to include the possibility of a fixed dichroic beam splitter.

In the specific embodiment, the infrared objectives (including condenser 22) are reflective Schwartzchild objectives, each comprising convex and concave spherical mirrors. The particular infrared objectives are 15× or 36× objectives, but other magnifications can be used.

Raman Mode

In a specific embodiment, the Raman functionality of the overall system is provided by a Raman spectrometer system such as the above-mentioned HoloProbe Raman spectrometer available from Kaiser Optical Systems. The Raman spectrometer includes a Raman probe head 50 and a Raman spectrometer base unit 55, coupled together by a fiber optic cable 57.

Further, in a specific embodiment, the probe head is fitted to an adapter (described below), which mounts to a dovetail recess on the microscope structure. This dovetail recess is otherwise used for mounting a binocular viewing head. The Raman probe head has a built-in CCD camera (not shown in the figures) to provide visible viewing of the sample prior to illumination by infrared or Raman excitation light.

In this specific embodiment, the Raman spectrometer system is coupled into the optical train along alternate path 45 by mounting the probe head as noted above and positioning mirror 40 in the second position. The particular probe head is generally as described in U.S. Pat. No. 5,377,004 to Owen et al. for "Remote Optical Measurement Probe," hereby incorporated by reference. Since the particular probe head is designed to accept and output collimated light, a collimating lens 60 is incorporated into the mounting adapter so as to be interposed in path 45 between mirror 40 and probe head 50. Lens 60 is preferably matched in focal length with mirror 27 (200 mm in the specific embodiment).

In Raman mode, mirror 40 is positioned in the path, and Raman excitation light is directed downwardly to mirror 40, whereupon the excitation light is directed over the common path segment to the sample. An alternate Raman objective, denoted in the figure as 25' and shown in phantom, is typically disposed in the path in place of infrared objective 25. The infrared and Raman objectives are typically mounted on a turret in accordance with known practice. This is shown schematically as a double-headed arrow between the two objectives. If desired multiple infrared or multiple Raman objectives can be mounted on the turret.

A standard visible objective is suitable for embodiments where the Raman excitation light and Raman scattered light are in the visible range. In the specific embodiment, 10× and 50× objectives, configured for operation in the near infrared as well as the visible range, are used, but other magnifications are possible. Suitable objectives are available from Olympus.

Light scattered from the sample is collected by objective 25' and retraces the path, entering Raman probe head 50 as a collimated beam. As is well known, the scattered light includes the desired Raman scattered light at wavelengths slightly displaced from the excitation wavelength and a larger amount of undesired Rayleigh scattered light at the excitation wavelength. As noted above, a dichroic beam splitter in the place of movable mirror 40 could achieve substantially the same result in diverting the returning light to the probe head.

Figure 2:
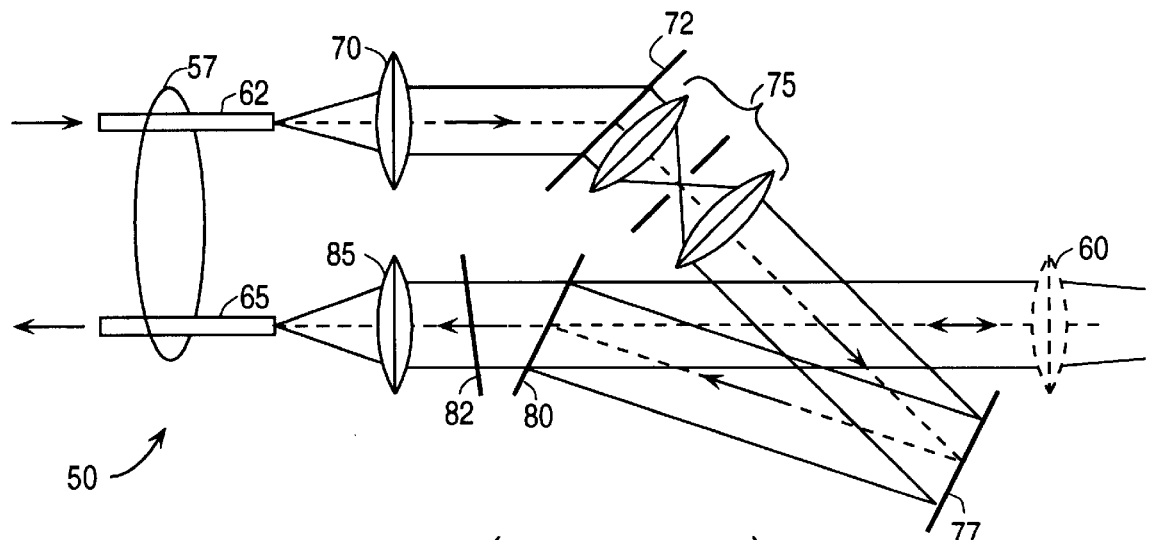
FIG. 2 is a schematic optical view of the Raman probe head used in some embodiments of the invention.

FIG. 2 is a schematic optical view of Raman probe head 50, as used in one embodiment of the invention. Fiber optic cable 57 is shown as having first and second fibers 62 and 65, respective first ends of which are connected to the probe head, and respective second ends of which are connected to base unit 55. The probe head operates (a) to receive excitation light emerging from the first end of first fiber 62 and direct it to lens 60, and, at the same time, (b) to receive returning light from lens 60, and direct the Raman scattered portion into the first end of second fiber 65. To this end, excitation light from fiber 62 is collimated by a lens 70 and directed to a holographic transmission grating 72. Light at the excitation wavelength is spatially filtered by a spatial filter 75 (shown as a pair of lenses and a pinhole) and directed to a reflector 77. The reflected light is again reflected by a holographic notch filter 80 (acting as a narrowband reflector) to emerge along path 45 toward the sample. Since the beam is collimated, lens 60 focuses the beam to image plane 30 whereby it reemerges to be collimated by mirror 27 passing through objective 25' for focusing on the sample.

The return beam from the sample, collimated by lens 60, enters Raman probe head 50. The collimated beam encounters holographic notch filter 80, which rejects Rayleigh scattered light from the sample, but passes the Raman scattered light. The light transmitted through filter 80 is further filtered by an additional holographic notch filter 82. The collimated beam, consisting primarily of the desired Raman light, is then focused by a lens 85 onto the first end of fiber 65 for communication to base unit 55.

Figure 3:
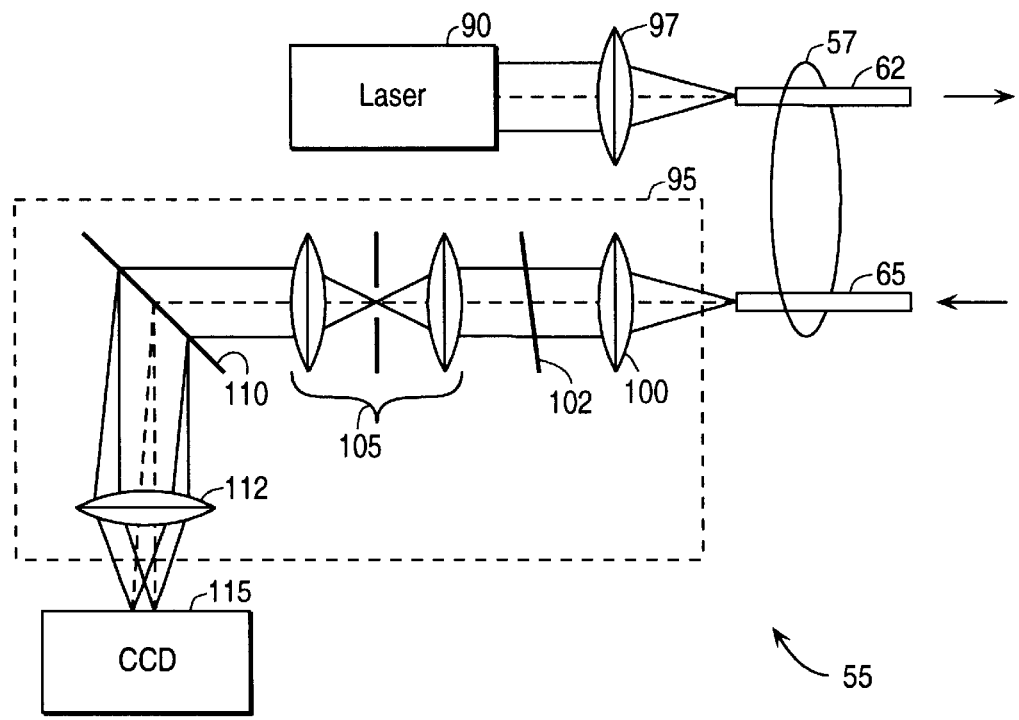
FIG. 3 is a schematic optical view of the Raman base unit used in some embodiments of the invention.

FIG. 3 is a schematic optical view of Raman spectrometer base unit 55 used in one embodiment of the invention. In short, the base unit includes the excitation laser 90, which provides the excitation light, and a holographic imaging spectrograph section 95. Laser 90 can be any type of laser suitable for providing Raman excitation light. The particular base unit is available with Nd:YAG lasers operating at 532 nm or 1064 nm, or a diode laser operating at 785 nm. Excitation light from laser 90 is focused by a lens 97 onto the second end of fiber 62 for communication to probe head 50.

Light arriving from the probe head emerges from the second end of fiber 65, is collimated by a lens 100, is further filtered by a holographic notch filter 102, passes through a spatial filter 105, and encounters a grating 110. Different wavelengths of light are spatially separated by the grating and are imaged by a lens 112 on different elements of a CCD array 115.

Sample Positioning

A significant advantage of the invention is that it avoids the need to remove the sample from the apparatus in order to do infrared and Raman measurements. In the specific implementation, stage can be positioned with a precision on the order of 1 micron. The repeatability of positioning of the turret is on the order of 10 microns, so there is some possibility that when the objective is switched (say from infrared to Raman), the focal point of the switched objective will become slightly displaced relative to the sample. Since it may be desired to do Raman sampling on a scale of 1 micron, it may be necessary to reposition the stage in order to center the objective on the desired portion of the sample.

This is done in viewing mode, with the sample illuminated with visible light. If the Raman laser is operating in the visible, it may be suitable for viewing. Otherwise, an auxiliary visible light source as discussed above can be used.

User interface software, not part of the present invention, is preferably provided to facilitate positioning. The image of the sample is displayed on a screen, and the user can position a cursor and click on a desired portion of the image (sample), whereupon the control computer causes the stage to move so that the desired portion is positioned on the optical axis of the objective. One or more fiducial marks can be provided on the sample holder to allow calibration of the positioning.

Alternative Embodiments

Figure 4:
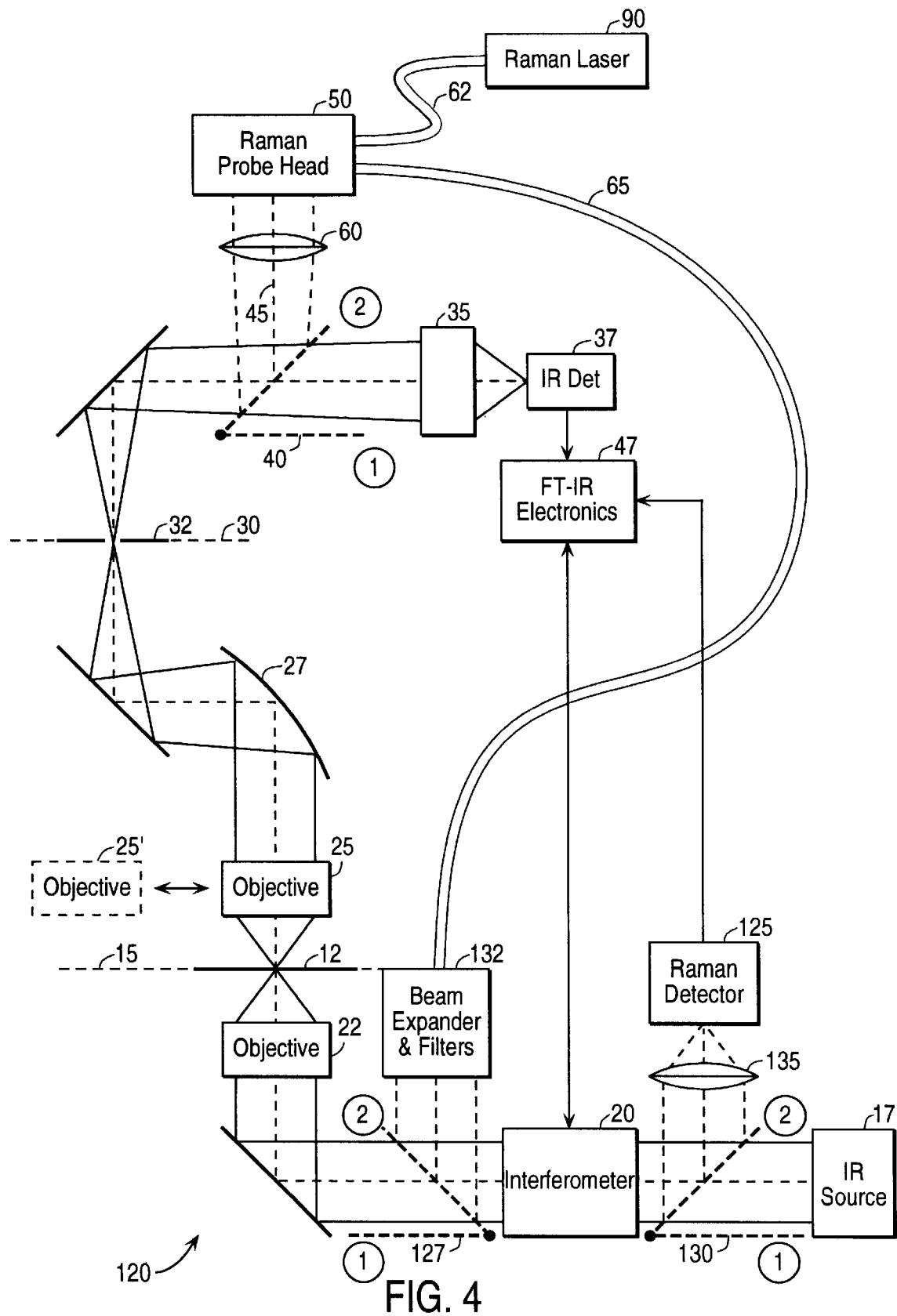
FIGS. 4–6 are schematic optical views of alternative embodiments of a combined infrared/Raman microscope system.

FIG. 4 is a schematic optical view of an alternative embodiment of a combined infrared/Raman microscope system 120. This embodiment makes use of the commercially available probe head, but uses the FT-IR spectrometer to perform the spectral analysis of the Raman scattered light. Elements corresponding to those described in connection with the embodiment described above are denoted with the same reference numerals.

In this embodiment, laser 90 is coupled to first fiber 62 as in the first embodiment, but the light from the probe head that enters second fiber 65 is directed through interferometer 20 to a Raman detector 125. This possibility is effected by a first additional movable mirror 127 selectively inserted into the path between the sample and the interferometer, and a second additional movable mirror 130 selectively inserted into the path between the interferometer sample and infrared source 17. Mirrors 127 and 130 are each shown as having two positions corresponding to the two positions of mirror 40. In the first position, intended for operation in the infrared mode, the mirrors are outside the path from the infrared source to the sample. In the second position, intended for operation in the Raman mode, the mirrors are in the path. As discussed above, fixed dichroic beam splitters could be used instead of movable mirrors.

To effect Raman operation, fiber 65 is coupled to a beam expander module 132, which may include elements corresponding to lens 100, notch filter 102, and spatial filter 105 in FIG. 3. The output is a collimated beam of Raman scattered light, which is directed into interferometer 20 when movable mirror 127 is in its second position. The interferometer modulates the Raman light, and the modulated light is deflected by movable mirror 130 (in its second position) to a lens 135, which focuses the light onto Raman detector 125. The Raman detector signal can be processed by the FT-IR electronics in much the same manner as the infrared detector signal.

Figure 5:
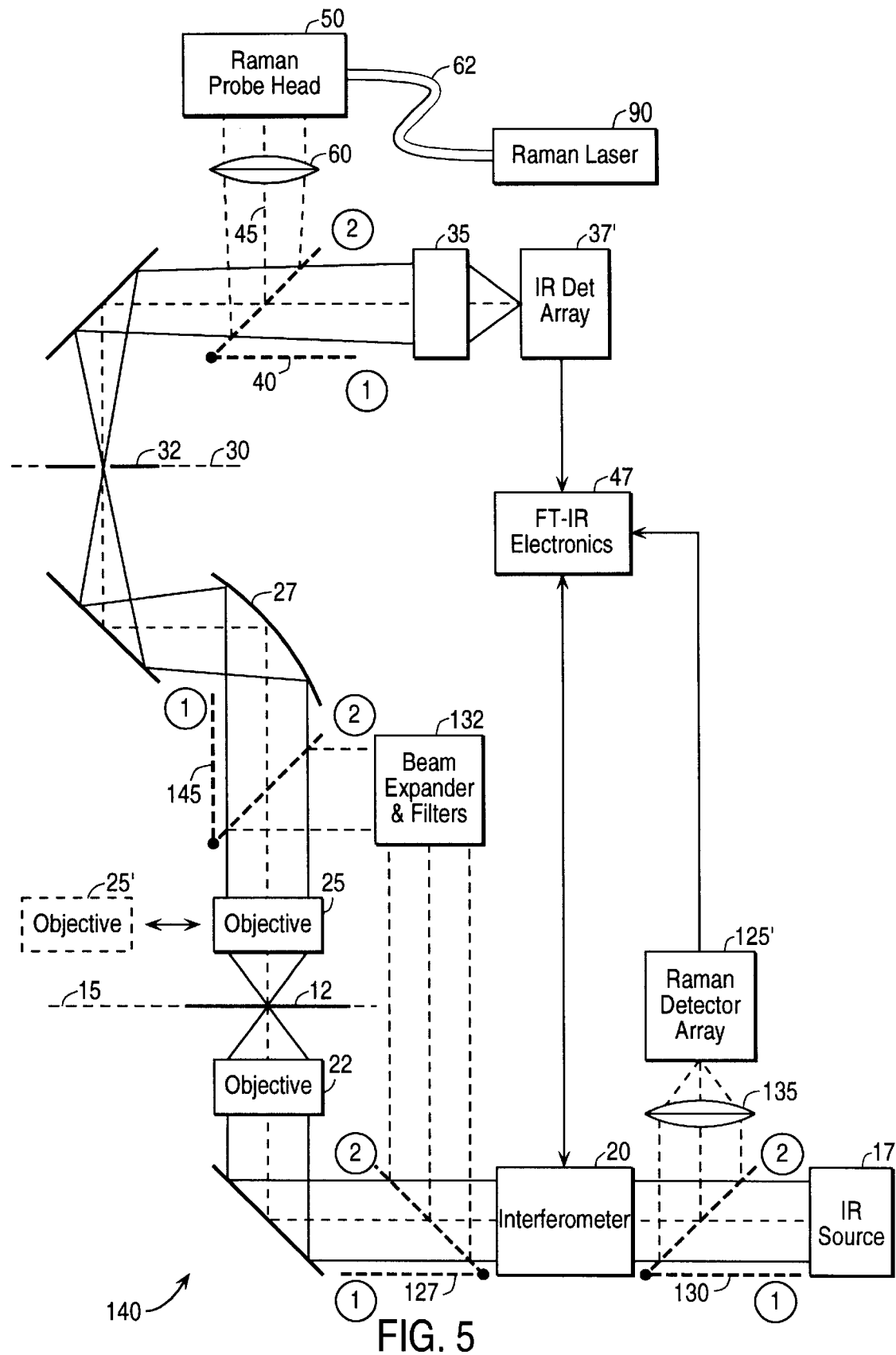

FIG. 5 is a schematic optical view of a further alternative embodiment of a combined infrared/Raman microscope system 140. This embodiment differs from the embodiment of FIG. 4 in that it provides infrared and Raman imaging capability. In partial furtherance of this additional functionality, infrared detector 37 is replaced by an infrared detector array 37' and Raman detector 125 is replaced by a Raman detector array 125'. Suitable types of infrared detector array include MCT (mercury cadmium tellurium) arrays or InSb arrays. An infrared imaging detector is commercially available from Bio-Rad Laboratories. Suitable types of Raman detector array include various CCD devices. U.S. Pat. No. 5,377,003 to Lewis et al. for "Spectroscopic Imaging Device Employing Imaging Quality Spectral Filters" is hereby incorporated by reference.

This embodiment further differs in that it does not use a fiber to bring the Raman light to the detector array. It may be difficult to achieve high image quality with a single fiber such as fiber 65. While it is possible to use a fiber bundle, with one fiber assigned to each pixel in the array, there may be some practical difficulties. For example, a 128×128 detector array would require over 16,000 fibers, whose spatial orientations would have to be maintained to reassemble the image properly.

Therefore, this embodiment uses an additional movable mirror 145 to transfer the Raman light to the interferometer. This is the same type of arrangement as used in the infrared reflective mode. Movable mirror 145 would block a portion of the Raman excitation beam, and would only intercept a portion of the Raman scattered light beam. This path would likely be separate from the reflected infrared path (not shown in any of the figures). Alternatively, movable mirror 145 could be replaced by a movable narrow passband filter that would pass the laser light but reflect the Raman scattered light. This filter could then allow the entire aperture of the objective to be filled.

Figure 6:
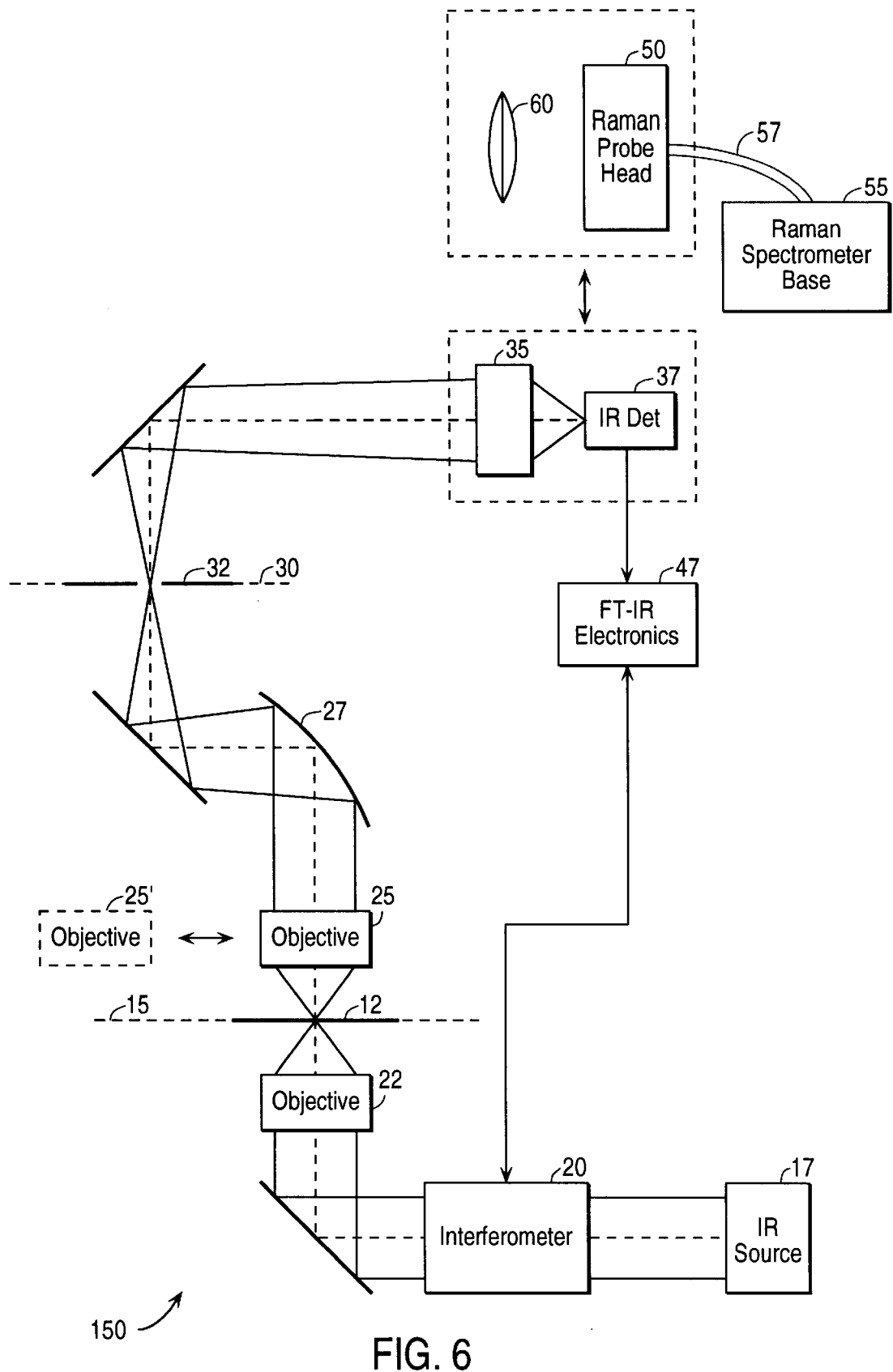

FIG. 6 is a schematic optical view of a further alternative embodiment of a combined infrared/Raman microscope system 150. This embodiment differs from the embodiment of FIG. 1 in that there is no element corresponding to movable mirror 40 (or a corresponding dichroic beam splitter) to deflect one type of light to an alternate path. Rather, the switch between infrared mode and Raman mode is effected by selectively moving infrared objective 35 and infrared detector 37, as a unit, or collimating lens 60 and probe head 50, as a unit, into the beam path. This is represented schematically as a double-headed arrow between the two units. It is also possible to modify the embodiments of FIGS. 4 and 5 in a like manner.

Mechanical Arrangement

Figure 7A:
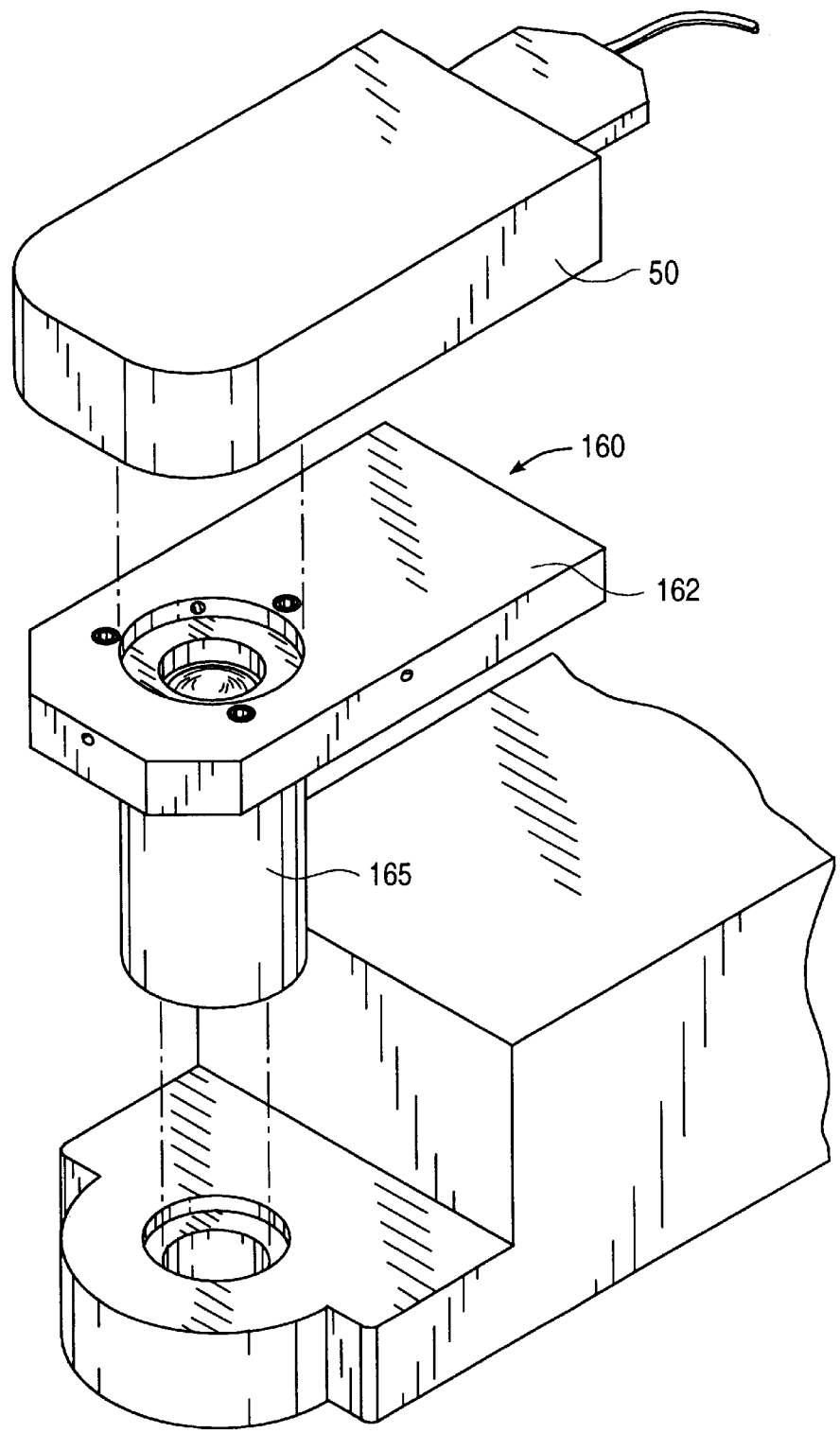
FIG. 7A is an exploded perspective view, showing the engagement of an interface adapter with the infrared microscope and the Raman probe head.
Figure 7B:
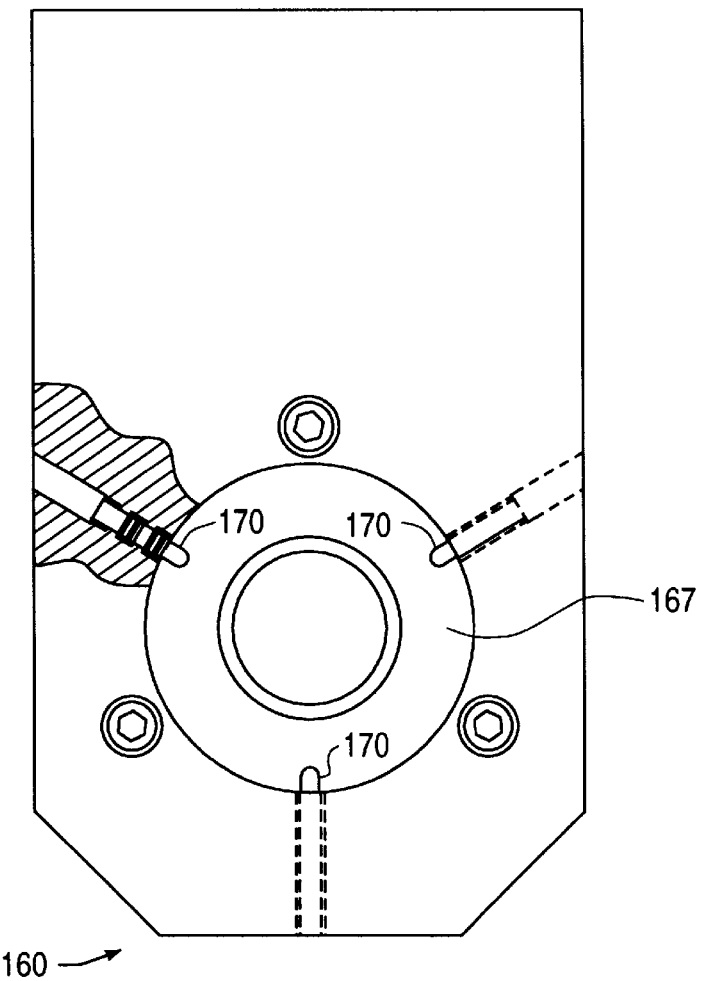
FIGS. 7B and 7C are top and end views of the interface adapter.
Figure 7C:
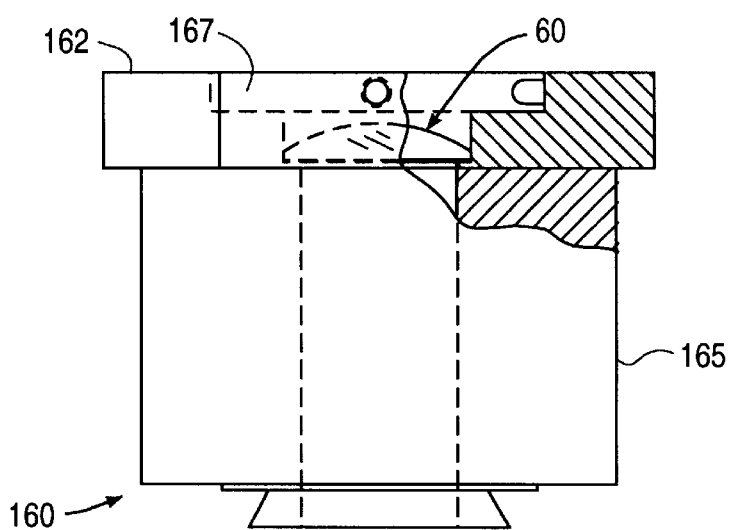

FIG. 7A is an exploded perspective view of an adapter 160, showing the engagement with the infrared microscope and the Raman probe head. FIGS. 7B and 7C are top and end views of the adapter. Adapter 160 includes a head support plate 162 and a downwardly extending tube 165. In the specific embodiment, the adapter interfaces to the infrared microscope and the Raman probe head using dovetail mounts, where one unit has a frustoconical (truncated cone) element that seats in a cylindrical recess in the other element, and is positioned and retained by set screws. These mounts are configured in accordance with geometry established for Olympus microscopes, and in the specific embodiment, using the above-described commercially available microscope and probe head, the adapter is configured for BH and BX mounts. Naturally, other mounting arrangements can be used.

The top surface of head support plate is formed with a cylindrical recess 167 having a sidewall through which set screws 170 protrude for engaging the frustoconical element of the Raman probe head's mount (not shown). The recess has a slightly larger diameter than that of the engaging frustoconical element to provide a degree of lateral adjustment. Lens 60 can be seen positioned within tube 165 at an appropriate height to collimate light emerging from a point in aperture plane 30 (shown for example, in FIG. 1).

Conclusion

In conclusion it can be seen that the present invention provides a technique for acquiring infrared spectral information and Raman spectral information without having to move the sample. This makes it possible to identify very small features reliably.

Figure 8:
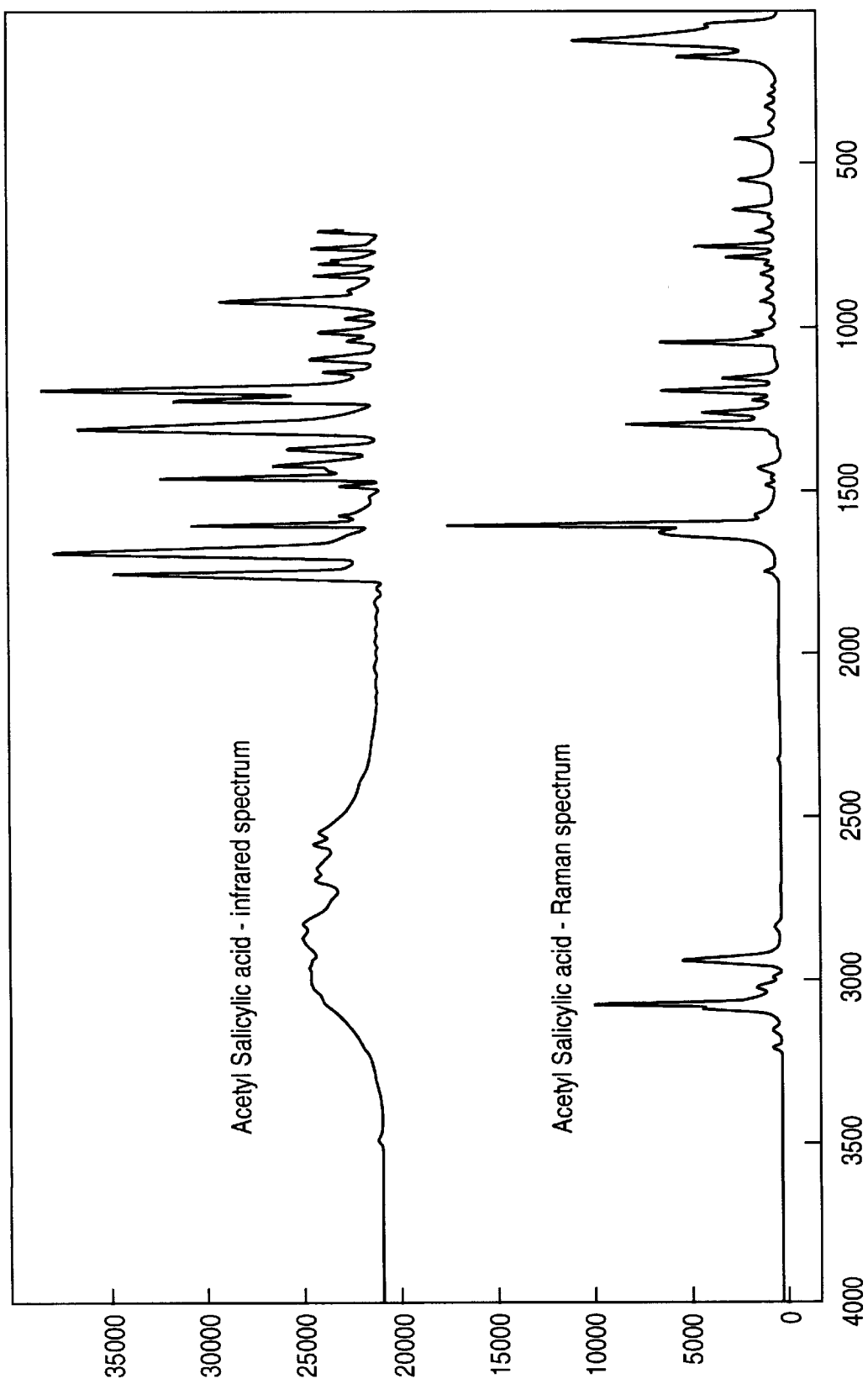
FIG. 8 is a plot showing the infrared and Raman spectra of a sample material.

FIG. 8 is a plot showing the infrared and Raman spectra of acetylsalicylic acid (the active ingredient in aspirin). The horizontal axis is in terms of wavenumbers ($cm^{-1}$ or number of wavelengths per centimeter, which is proportional to photon energy). The upper curve is the spectrum of a single crystallite of acetyl salicylic acid obtained by micro-infrared spectroscopy, and the bottom curve is the equivalent micro-Raman spectrum. Although there are some bands in common, more noticeable is the difference between these two spectra, markedly pointing out the complementary nature of the two techniques, and the desirability of being able to perform both.

The infrared spectrum arises directly from the absorption of radiation at sample specific frequencies in the infrared, and therefore the spectral plot represents absorption at those frequencies. While the wavelength of the Raman scattered light is generally near the wavelength of the excitation laser (visible or near infrared), the plot shows the same horizontal axis, which extends beyond the near infrared. This is because the Raman spectrum arises indirectly based on the amount of energy gained or lost (via inelastic scattering) from a single excitation frequency. The quantity of energy is specific to the frequency of a vibrational level of the sample. Regardless of the frequency of the excitation laser, the relative shift is the same. The frequencies of the fundamental Raman excitation vibration modes lie between 4000 and 50 $cm^{-1}$ (corresponding to wavelengths between 2.5 microns and 200 microns).

While the above is a complete description of specific embodiments of the invention, various modifications, alternative constructions, and equivalents may be used. For example, while the specific embodiments show the infrared spectroscopic analysis being performed using a Fourier Transform spectrometer, this is not necessary to the invention. Grating and other dispersive spectrometers could also be used. Furthermore, while the embodiments have the infrared illumination and the Raman illumination performed at separate times, such is not fundamental. To the extent that the same infrared objective can be used for the Raman excitation, an embodiment using dichroic beam splitters rather than movable mirrors would permit simultaneous infrared and Raman analysis. Therefore, the above description should not be taken as limiting the scope of the invention as defined by the claims.

What is claimed is:

1. Apparatus for performing infrared and Raman spectroscopic analysis of a sample, the apparatus comprising:

a sample stage for holding the sample;

an infrared source of infrared light for illuminating the sample;

an excitation source of excitation light for illuminating the sample;

an infrared detector;

a Raman detector;

a configurable optical path for selectively (a) in a first mode, optically coupling (a1) said infrared source so as to illuminate the sample, and (a2) said infrared detector so as to detect infrared light emanating from the sample, or (b) in a second mode, optically coupling (b1) said excitation source so as to illuminate the sample, and (b2) said Raman detector so as to receive Raman scattered light emanating from the sample; and an interferometer disposed in a common path segment of said configurable optical path such that (a) in said first mode, said light from said infrared source passes through said interferometer before encountering the sample, and (b) in said second mode, said Raman scattered light emanating from the sample passes through said interferometer before encountering said Raman detector.

2. The apparatus of claim 1 wherein said configurable optical path includes separate infrared and Raman objectives selectively insertable in a path segment to intercept light travelling from the sample.

3. The apparatus of claim 1 wherein said configurable optical path includes a mirror that is movable between a first position where light bypasses said mirror and a second position where light is deflected by said mirror.

4. The apparatus of claim 1 wherein said configurable optical path includes a dichroic element that passes one of Raman light and infrared light and reflects the other of Raman light and infrared light.

5. The apparatus of claim 1, wherein said infrared light is directed through the sample.

6. The apparatus of claim 1, wherein said Raman detector receives light travelling away from the sample in a direction opposite to a direction in which said excitation light travels toward the sample.

7. The apparatus of claim 1, wherein said infrared detector is a detector array.

8. The apparatus of claim 1, wherein said Raman detector is a detector array.

9. The apparatus of claim 1, wherein said interferometer modulates said Raman scattered light leaving the sample.

10. Apparatus for performing infrared and Raman spectroscopic analysis of a sample, the apparatus comprising:

a sample stage for holding the sample;

an infrared source of infrared light for illuminating the sample;

an excitation source of excitation light for illuminating the sample;

an infrared detector;

a Raman spectrometer; and a configurable optical path for selectively (a) in a first mode, optically coupling (a1) said infrared source so as to illuminate the sample, and (a2) said infrared detector so as to detect infrared light emanating from the sample, or (b) in a second mode, optically coupling (b1) said excitation source so as to illuminate the sample, and (b2) said Raman spectrometer so as to receive Raman scattered light emanating from the sample wherein said configurable optical path includes a mechanism for selectively interposing said infrared detector and said Raman spectrometer in an optical path of light travelling from the sample.

11. Apparatus for performing infrared and Raman spectroscopic analysis of a sample, the apparatus comprising:

a sample stage for holding the sample;

an infrared objective;

a Raman objective;

a mounting structure for positioning a selected one of said infrared objective and said Raman objective in a common path segment that includes the sample and extends in a first direction to a particular location;

an optical train disposed in said common path segment for transferring light between the sample and said particular location;

a movable mirror at said particular location having first and second positions such that
  (a) when said mirror is in said first position, light travelling along said common path segment in said first direction travels along an infrared path segment, and
  (b) when said mirror is in said second position, light travelling along said common path segment in said first direction travels along a Raman path segment;

an infrared source of infrared light for illuminating the sample;

an infrared detector disposed in said infrared path segment;

an excitation source of excitation light for illuminating the sample; and a Raman spectrometer coupled to said Raman path segment;

the apparatus being operable in an infrared mode and a Raman mode, wherein
  (a) the infrared mode has said infrared objective in said common path segment and the mirror in said first position so that light from said infrared source illuminates the sample, and infrared light emanating from the sample reaches said infrared detector after leaving the sample and travelling over said common path segment and said infrared path segment, and
  (b) the Raman mode has said Raman objective in said common path segment and the mirror in said second position so that light from said excitation source illuminates the sample, and Raman scattered light reaches said Raman spectrometer after leaving the sample and travelling over said common path segment and said Raman path segment.

12. The apparatus of claim 11, wherein said source of excitation light is optically coupled to said Raman path segment so that when said mirror is in said second position, said excitation light is communicated to said common path segment and travels to said sample in a second direction opposite said first direction.

13. The apparatus of claim 11, wherein said infrared light is directed through the sample and along said common path segment in said first direction to said infrared detector.

14. The apparatus of claim 11, wherein said infrared light is coupled into said common path so as to travel in a second direction opposite said first direction through said infrared objective to said sample, and thereafter travel away from said sample in said first direction to said infrared detector.

15. The apparatus of claim 11, and further comprising an interferometer which modulates said infrared light prior to said infrared light illuminating the sample.

16. The apparatus of claim 11, wherein said Raman spectrometer is a grating spectrometer.

17. The apparatus of claim 11, wherein said Raman spectrometer is a Fourier Transform spectrometer.

* * * * *